United States Patent
Zhang et al.

(10) Patent No.: US 8,842,703 B1
(45) Date of Patent: Sep. 23, 2014

(54) PRACTICAL METHOD AND DEVICE FOR ENHANCING PULSE CONTRAST RATIO FOR LASERS AND ELECTRON ACCELERATORS

(75) Inventors: Shukui Zhang, Yorktown, VA (US); Guy Wilson, Norfolk, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 194 days.

(21) Appl. No.: 13/385,728

(22) Filed: Mar. 5, 2012

Related U.S. Application Data

(60) Provisional application No. 61/516,064, filed on Mar. 29, 2011.

(51) Int. Cl.
*H01S 3/10* (2006.01)

(52) U.S. Cl.
USPC .......................................................... 372/25

(58) Field of Classification Search
CPC ..... H01S 3/107; H01S 3/1061; H01S 3/1063; H01S 3/1065

USPC .......................................................... 372/25
See application file for complete search history.

(56) References Cited

U.S. PATENT DOCUMENTS

| | | | |
|---|---|---|---|
| 7,619,231 B2 * | 11/2009 | Huang ........................ | 250/493.1 |
| 8,462,828 B1 * | 6/2013 | Estes .............................. | 372/106 |
| 2005/0157382 A1 * | 7/2005 | Kafka et al. .................. | 359/346 |

* cited by examiner

*Primary Examiner* — Tuan Nguyen

(57) ABSTRACT

An apparatus and method for enhancing pulse contrast ratios for drive lasers and electron accelerators. The invention comprises a mechanical dual-shutter system wherein the shutters are placed sequentially in series in a laser beam path. Each shutter of the dual shutter system has an individually operated trigger for opening and closing the shutter. As the triggers are operated individually, the delay between opening and closing first shutter and opening and closing the second shutter is variable providing for variable differential time windows and enhancement of pulse contrast ratio.

10 Claims, 15 Drawing Sheets

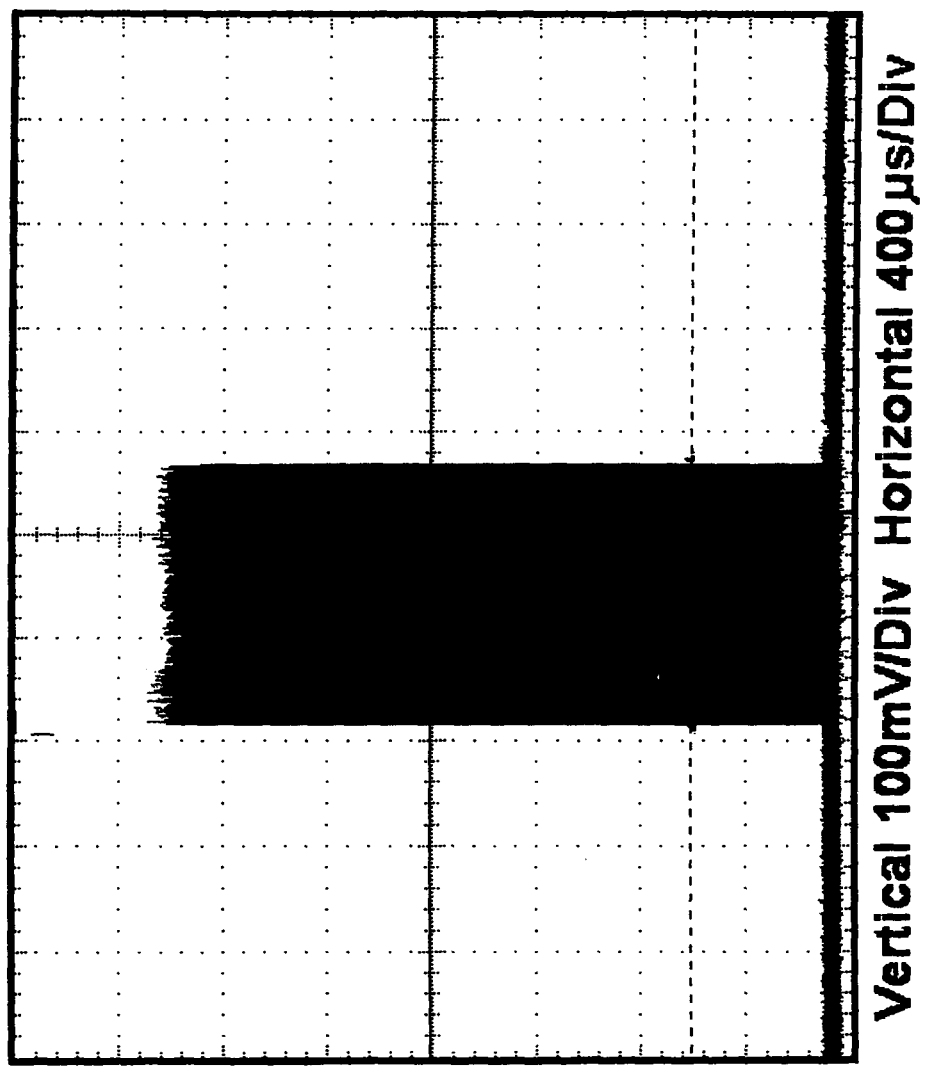

US 8,842,703 B1

PRACTICAL METHOD AND DEVICE FOR ENHANCING PULSE CONTRAST RATIO FOR LASERS AND ELECTRON ACCELERATORS

This application claims the benefit of U.S. Provisional Application No. 61/516,064 filed on Mar. 29, 2011 for "A Practical Method and Device for Enhancing Pulse Contrast Ratio For Lasers and Electron Accelerators" incorporated herein by reference in its entirety.

The United States government may have certain rights to this invention under Management and Operating Contract No. DE-AC05-06OR23177 from the Department of Energy.

FIELD OF INVENTION

The invention relates to a device and method for creating enhanced pulse contrast ratios for drive lasers and photo-cathode-based electron accelerators.

BACKGROUND OF INVENTION

Photo-cathode-based accelerator systems and light sources are driven by drive lasers. The drive lasers associated with these systems must meet rigid specifications regarding such features as pulse length, wavelength, power, repetition rate, beam quality, intensity, and phase stability. Such accelerator systems consist of many complicated components requiring high precision and care in tuning the instrument and requiring a very high degree of careful implementation of a well-developed procedure for initial instrument tuning and set-up.

A drive laser plays an important role in the tuning and set up. One of the most basic and important requirements on a drive laser is to provide macro-pulses having various macro-pulse lengths and repetition rates. Accelerator systems are set up at low current (which means low pulse repetition rate at selected pulse length(s)) before operating the accelerator in high current modes. Since drive laser micro-pulses are MHz to GHz quasi-CW (continuous wave) pulse trains generated by pico-second (ps) mode-locked oscillator and amplifiers, fast electro-optic (EO) devices such as Pockels cells are usually used to chop out a macro-pulse with a selected time duration and repetition rate. The macro-pulse length is typically determined solely by the "on" and "off" time of the Pockels cell which is driven by a high voltage electrical pulse. Leakage through the Pockels cell (i.e. which causes unwanted ghost pulses) always exists in the prior art due to the limited contrast of the Pockels cell. Ghost pulses are problematic to the operation of the accelerator as they interfere with the electron beam diagnostics and may cause excessive radiation along the beam line. Accordingly, eliminating ghost pulses or alternatively minimizing ghost pulses to below an acceptable threshold level would be highly desirable.

One method of increasing pulse contrast (i.e. eliminating ghost pulses) is to use a plurality of Pockels cells. However, using multiple Pockels cells has several disadvantages including substantial cost, alignment difficulties and laser power loss.

Alternatively, a Pockels cell may be used in combination with a mechanical shutter as blocking a laser pulse in an effective method of eliminating an unwanted pulse. In a system having a Pockels cell and a fast mechanical shutter, the Pockels cell provides a gated time window with fast leading edge and falling edges shorter than the interval between two macro-pulses. Typically this window is a few nano-seconds. The mechanical shutter provides a wider window that eliminates the ghost pulses outside the Pockels cell window and improves the overall pulse contrast. While the use of a mechanical shutter can significantly improve the overall pulse contrast (i.e. remove a portion of the ghost pulses), the shutters of the prior art address the ghost pulses outside the window but do not eliminate ghost pulses inside the exposure window. The ghost pulses inside the exposure window remain and continue to adversely impact the pulse contrast.

Theoretically, the mechanical shutter's window can be shortened to a level of a few milliseconds, but even if the window is shortened to the limit, ghost pulses remain inside the exposure window. Further the macro-pulse length generated by a Pockels cell is variable and can be as short as sub micro-seconds. For very short macro-pulse lengths, the ghost pulses can become the principle feature of the contrast due to the relatively fewer main signal pulses.

Accordingly, a practical method for creating enhanced pulse contrast ratios for drive lasers and photo-cathode-based electron accelerators is needed.

SUMMARY OF INVENTION

The present invention provides a device for producing enhanced pulse contrast ratio. The device comprises a first mechanical shutter and a second mechanical shutter, the first and the second mechanical shutters positioned in series in a beam path of a laser pulse. The device further comprises a first trigger wherein the first trigger activates a first shutter change between an open and a closed position; and a second trigger wherein the second trigger activates a second shutter change between an open and a closed position. A controller sets a predetermined time delay between the first trigger activating the first shutter and the second trigger activating the second shutter wherein the time delay produces a differential time window between the first shutter change and a second shutter change.

The present invention also provides a method for enhancing pulse contrast ratio. The method comprises providing a first mechanical shutter and a second mechanical shutter, the first and the second mechanical shutters are positioned in series in a beam path of a laser pulse. The device further comprises a first trigger wherein the first trigger activates a first shutter change between an open and a closed position and a second trigger wherein the second trigger activates a second shutter change between and open and a closed position. A controller sets a predetermined time delay between the first trigger activating the first shutter and the second trigger activating the second shutter wherein the time delay produces a differential time window between the first shutter change and a second shutter change. The method further comprises providing a laser macro-pulse from the laser beam; selecting and setting a predetermined time delay; producing a differential time window; and passing the macro-pulse through the first and the second shutter in the differential time window.

DESCRIPTION OF DRAWINGS

FIG. 5 shows traces of measured electron beam current from a cavity beam monitor in an electron beam accelerator.

DETAILED DESCRIPTION OF INVENTION

The present invention includes a device and method for enhancing pulse contrast ratios for drive lasers and electron accelerators. The device includes a mechanical shutter system with a variable time window that follows the macro-pulse duration and enhances the overall pulse contrast. In one embodiment the invention comprises a dual-shutter system wherein two shutters are placed in series in the beam of a drive laser to produce a differential time window. Each shutter of the dual shutter system has a trigger for opening and closing the shutter. As the triggers are operated individually, the delay between opening and closing the first shutter and opening and closing the second shutter is variable. The variable delay between triggers provides for a variable differential time window. The variable differential time window provides for blocking ghost pulses to improve the pulse contrast ratio. The system is particularly effective for short pulses.

As used herein a micro-pulse is the ungated pulse originating from a mode-locked pulse train with MHz to GHz repetition rates. A macro-pulse is generated when the micro-pulse train is gated by an optical switch such as a Pockels cell, for example. A macro-pulse contains many micro-pulses within its time duration. When the macro-pulse is captured on an oscilloscope the micro-pulses appear as a "comb-like" plurality of very sharp narrow pulses in the macro-pulse time duration window. As used herein ghost pulses are low amplitude pulses which remain after gating due to the limited extinction ratio of an optical gating switch.

Figure 1:
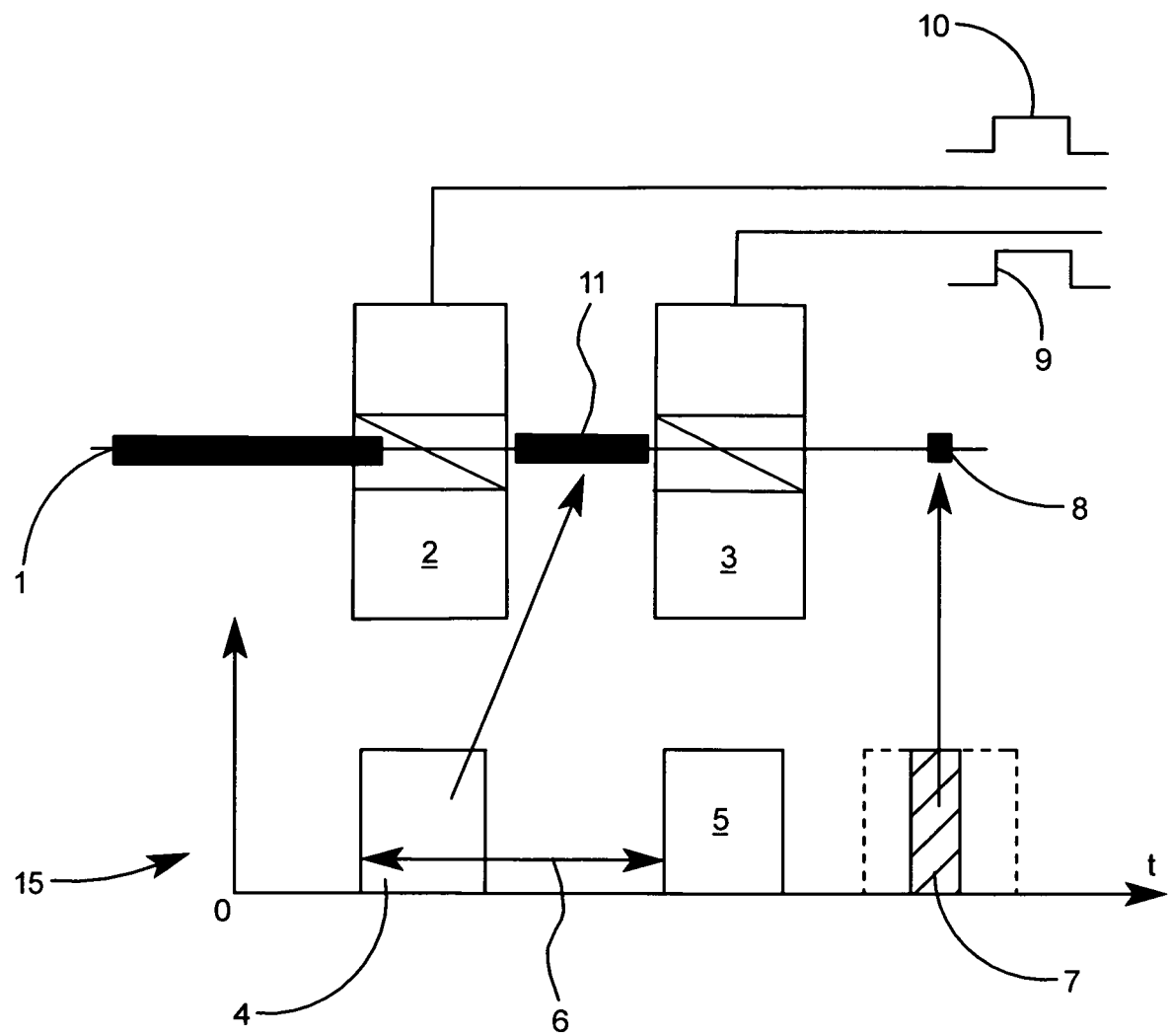
FIG. 1 is a schematic diagram of one exemplary embodiment of the dual shutter system of the invention.

FIG. 1 is a schematic diagram showing an exemplary embodiment of the dual shutter device of the invention. Referring to FIG. 1, first shutter 2 and second shutter 3 are positioned sequentially in series in pulsed laser beam 1 path. (As used herein two shutters in series means that the shutters are positioned in a laser beam path such that when both shutters are open, the laser beam passes through the first shutter and subsequently the second shutter unimpeded.) Each of the first shutter 2 and the second shutter 3 has an open position and a closed position and can be activated to change between the open and the closed position. As used herein if a shutter is said to change "between" the open and the closed position this includes both moving from an open position to a closed position and moving from a closed to an open position and means moving from one position to the other.

In the exemplary embodiment of FIG. 1 the opening and closing of the first shutter 2 is controlled by a first trigger 10 and the opening and closing of the second shutter 3 is controlled by second trigger 9. The triggers 9,10 operate independently and thus a delay between the triggers 9,10 can be selected to provide a differential window formed by the opening of the first shutter 2 and the closing of the second shutter 3. When the first shutter 2 opens it lets out a portion 11 of the laser beam within its open time window. The second shutter 3 opens when the first shutter 2 opens, but closes at a delayed time which is determined by trigger 9 at the designated time for trigger 9. Accordingly, the resultant laser pulse 8 passing from the second shutter 3 is narrower than the portion 11 of the laser beam exiting the first shutter 2. The leading and the falling edges of the laser pulse 8 are determined by the rise time of the first shutter 2 and the fall time of the second shutter 3, respectively.

The time line 15 shown in the lower portion of FIG. 1 is a schematic representation of the timing of the differential time window created by the dual shutter system. The time window for the first shutter 2 is the first time window 4 and the time window for the second shutter 3 is the second time window 5. The opening of the second shutter 3 is offset from the opening of the first shutter 2 by time delay 6. The time delay between the opening of first shutter 2 and second shutter 3 yields the resultant window 7 which is significantly narrower than the window associated with either of the shutters 2,3 individually. As the shutter 2,3 are triggered independently the minimum window width of the resultant window 7 is limited only by the actual rising and falling time of the shutters 2,3.

Figure 2:
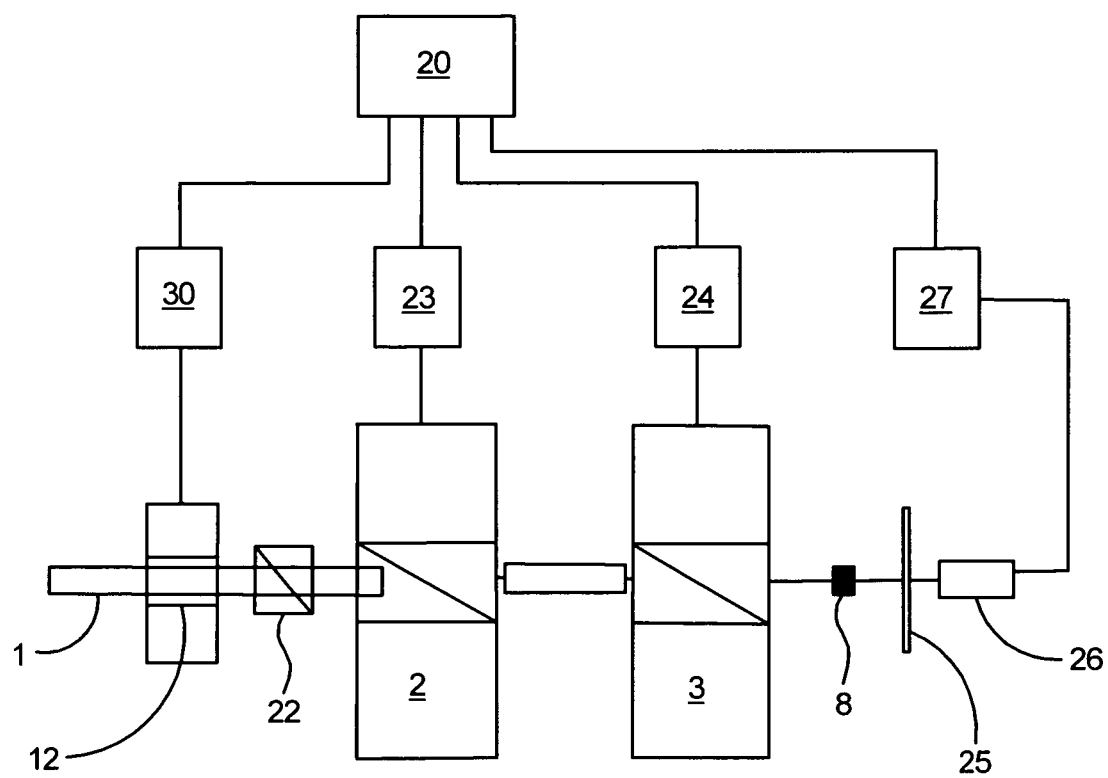
FIG. 2 is a schematic representation of one exemplary embodiment of a system employing the dual shutter system of the invention.

FIG. 2 is a schematic diagram of an exemplary embodiment of the system employing the dual shutter device of the invention. As shown in FIG. 2 laser beam macro-pulse 1 is generated by a Pockets Cell 12 which is driven by Pockets cell driver 30 and is passed though polarizer 22 to first shutter 2 which has a defined first time window created by opening and closing the first shutter 2. The opening and closing of the first shutter 2 is controlled by trigger 23. The portion of the pulse that passes though the first shutter 2 passes toward the second shutter 3 which operates with a predetermined time delay from the opening of the first shutter 2. The second shutter 3 has a defined second time window created by opening and closing the second shutter 3. The opening and closing of the second shutter 3 is controlled by trigger 24.

It is preferable that the rising edge of the of the macro-pulse from the Pockels Cell 12 be kept close to the opening of the first shutter 2 in order for the ghost pulses preceding the signal to be blocked by the first shutter 2. Keeping the falling edge of the macro-pulse from the Pockets cell 12 close to the closing of the second shutter 3 allows for ghost pulses preceding the signal to be blocked by the delayed leading edge of the second shutter 3. The predetermined time delay between the opening of the first shutter 2 and the closing of the second shutter 3 provides a narrow window and a narrowed resultant pulse 8 exits the second shutter 3. Preferably the triggering and synchronization system is programmed to drive the shutter in a way such that ghost pulses are minimized without affecting the macro-pulse shape.

For the exemplary embodiment of FIG. 2, the resultant pulse 8 is passed though a filter 25 to a photodiode 26 and then to an oscilloscope 27. Controller 20 provides for control of the system including synchronizing triggering of the shutters 2,3, and Pockels cell's driver. The oscilloscope 27 is used to characterize the resultant pulse 8 once the resultant pulse has been characterized the use of the detector 27 is optional and the resultant pulse 8 may be directed via optics to drive a photo-cathode-based accelerator and/or light source.

Optionally, the apparatus may further comprise a cooling system for the shutters as they may tend to heat when operated at a very rapid-rate. In some embodiments the pulse shape may be distorted if the shutter is heated up at a high repetition rate or held open for a long period of time. In one exemplary embodiment a cooling system in communication with the shutters may be used to keep the shutters at a suitable temperature. This can be accomplished for example by using a compact commercial chiller to run cooling water though the shutters' mount.

In one embodiment commercially available mechanical shutters may be used in the system. Preferably mechanical shutters specifically designed for laser applications are used. In one exemplary embodiment two electro-mechanical shutters model LST200 from nmLaser Product, Inc. (www.nmlaser.com) were used. Other shutters may likewise be suitable so long as they are suitable for use with the laser powers of the system, have a relatively fast switching speed, i.e. switching speed of less than 100 micro-seconds, and have good stability. Preferably the shutters are well aligned to allow clean beam throughput. In some embodiments it is preferable to use two identical shutters to facilitate alignment and precision performance.

The primary limitation of the dual-mechanical shutter device is an individual shutter's mechanical switching time. By using a dual shutter system in which each of the shutters is opened and closed independently and their opening and closing are offset, a very short macro-pulse of micro or milli seconds with minimization of ghost pulses (i.e. high contrast ratio) can be generated. Thus, the dual shutter device provides a simple, relatively inexpensive and reliable method for producing very short laser pulses with high contrast ratio.

The very short high contrast ratio laser pulses produced by the apparatus and methods of the invention are particularly useful for machine operation set-up, and diagnostics for photo-cathode based accelerators and light sources which are extremely sensitive to ghost pulse background. However the apparatus and methods of the invention are also useful for other applications having macro-pulse modes and requiring various shorter pulse lengths in which high average short pulse laser power is crucial and the presence of ghost pulses potentially disruptive. Such applications include for example laser material processing, and laser micro-machining.

Example 1

The following example is provided for illustrative purposes. A dual shutter apparatus as describe above and shown in FIG. 2 was constructed using two electro-mechanical shutters Model LST200 (nmLaser Product, Inc., www.nmlaser.com). A reflective moving mirror was positioned in the beam path inside the shutter to divert the beam into the shutter base when the shutter is closed. The shutters were triggered by signals from a multi-channel synchronization signal pulse generator with a variable time delay. The trigger signals communicated to the shutter controllers.

Laser micro pulses were generated from a diode-pumped solid-sate system. Each micro-pulse was about 20 ps long. The combination of Pockels cell and a polarizer produced a macro-pulse whose pulse width was determined by the high voltage electrical driving pulse applied to the Pockels cell. The laser pulse signal passing through the apparatus was received by a fast photo-diode and displayed on an oscilloscope. The triggers and delays to the Pockels cell, shutters and the oscilloscope came from the same multi-channel synchronization system.

The two shutter could be opened and closed independently and were typically operated with a predetermined time delay. As shown in FIG. 2 the shutters were positioned in the beam path sequentially and parallel to each other and each shutter had its own trigger for opening and closing the shutter. When a shutter was in the open position the laser beam passed through and when the shutter was closed the laser energy was safely dumped into the shutter absorbing body. As the triggers are operated individually, the delay between opening and closing first shutter and opening and closing the second shutter is variable. This variable delay between triggers provided for a differential time window, the length of which was determined by selecting the time delay between triggering the first and triggering the second shutter.

Figure 3A:
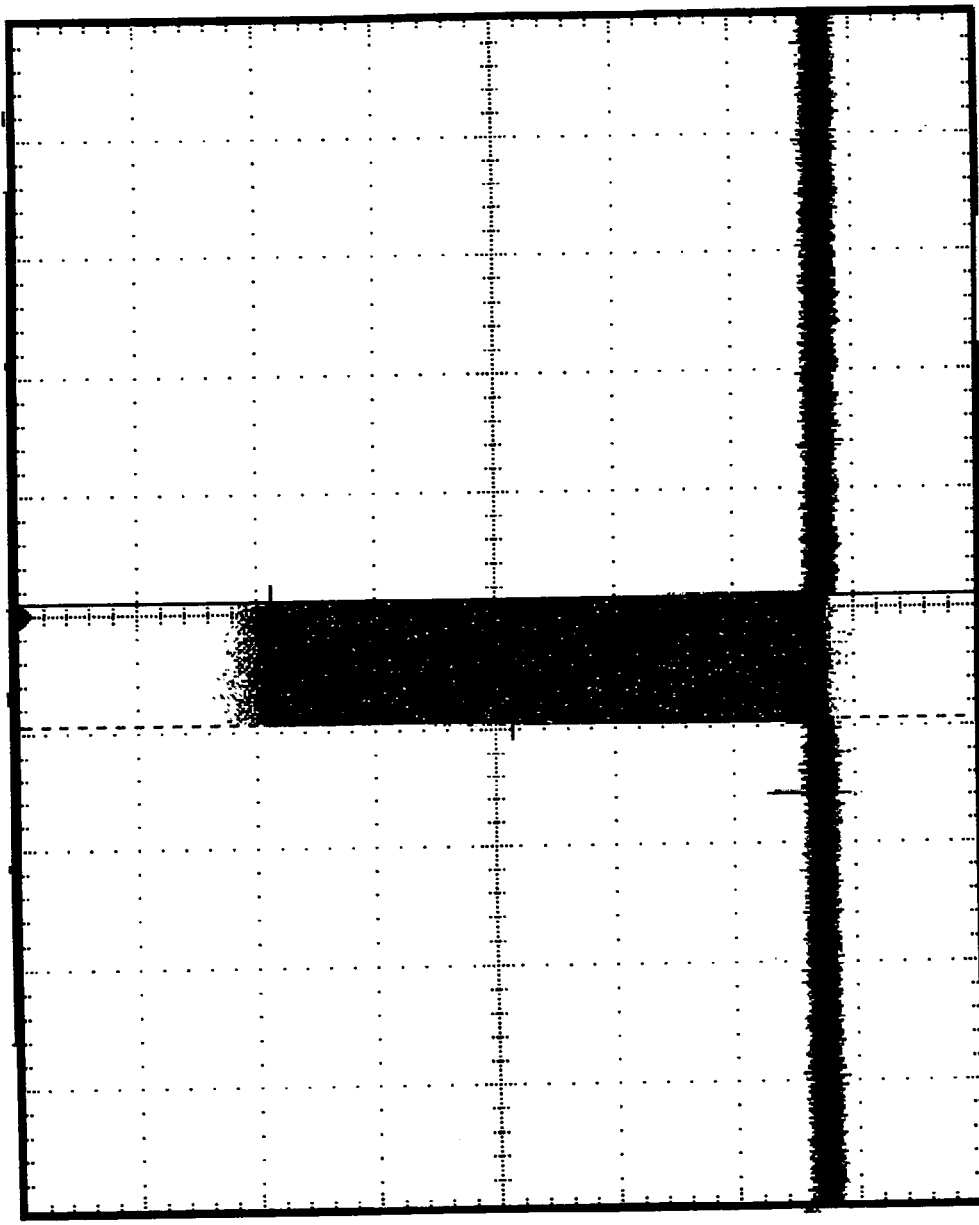
FIG. 3 shows oscilloscope traces of pulses from a single shutter response measurements including (a) the entire time window of a single shutter, (b) expanded scale of rising edge time trace, and (c) expanded scale of falling edge time trace.
Figure 3B:
Figure 3C:
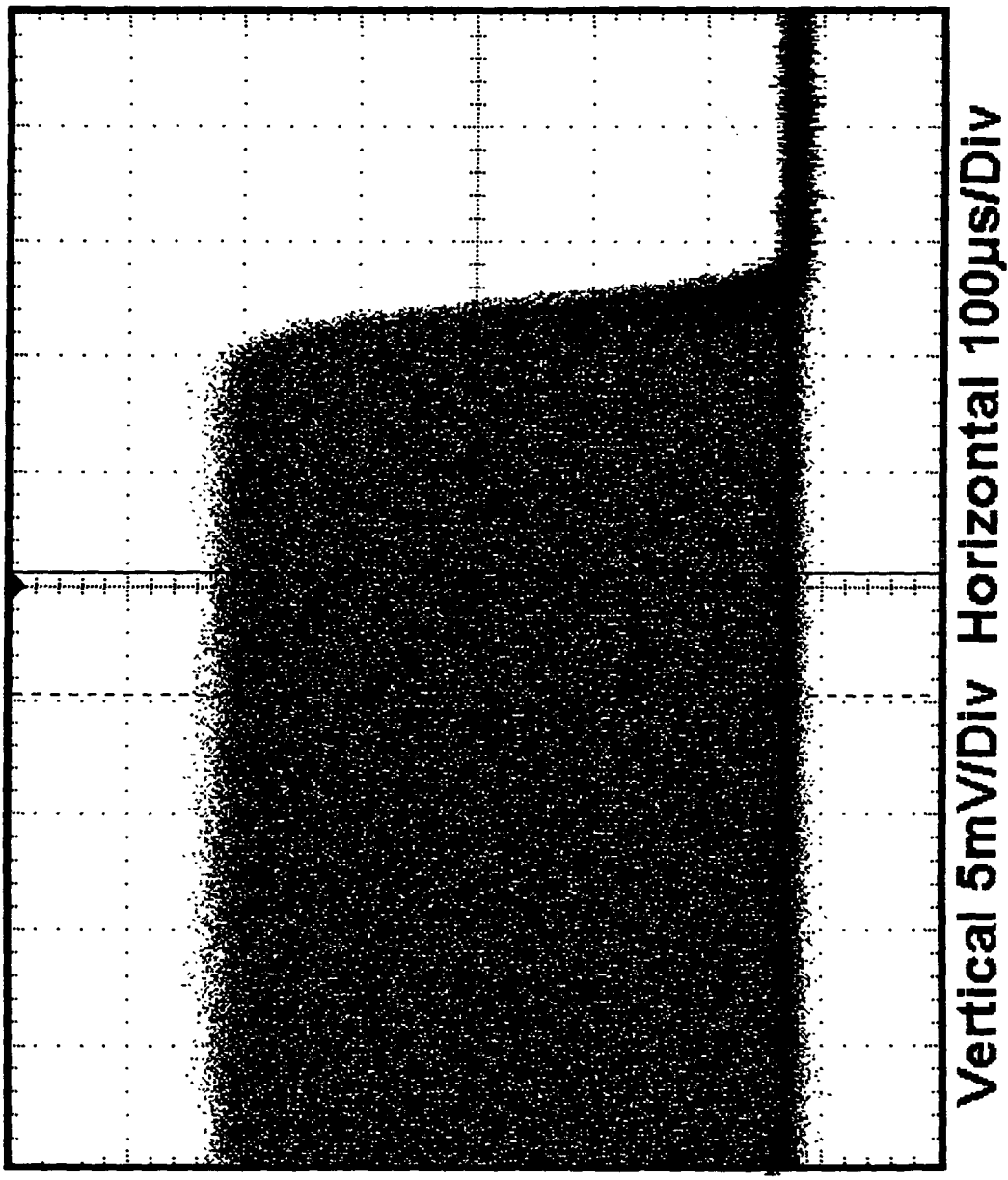

As the shutters are triggered independently for test and/or comparative purpose it is possible to trigger only one shutter while holding the other shutter open. Accordingly, initial testing involved characterization of the response of each shutter independently. As shown in FIG. 3a the minimum time window duration of the shutter of the apparatus of Example 1 was about 2 ms. It is preferable to operate the shutter with a time window slightly wider that the minimum width possible to obtain a more stable laser pulse shape. The time required for the shutter to open is shown as the rising edge time in FIG. 3b and the time for the shutter to close is the falling edge time as shown is FIG. 3c. As FIGS. 3b and 3c show both the rising edge and the falling edges are less than about 100 micro seconds. Each shutter was tested individually and no differences in performance were observed.

Tests performed using the apparatus of Example 1, showed no observable timing jitter on either the rising edge or the falling edge under normal operating conditions on the time scale employed for the testing. However, some distortion of the pulse shape was observed when a shutter was heated up due to a high repetition rate or held open for a long period of time (i.e. a few hours). The heating problem was resolved in the apparatus of Example 1 by using a compact commercial chiller to run cooling water though the shudders' mount.

A laser beam size of about 0.5 mm in diameter was used for the test. Potentially the laser beam size could affect the measurement due to the limited transient time the cantilever of the shutter need to open and close. However, as in a given set-up the laser beam size would typically be constant, once the set-up was characterized, the laser beam size should not further impact operation of the device of the invention.

Example 2

Figure 4B:
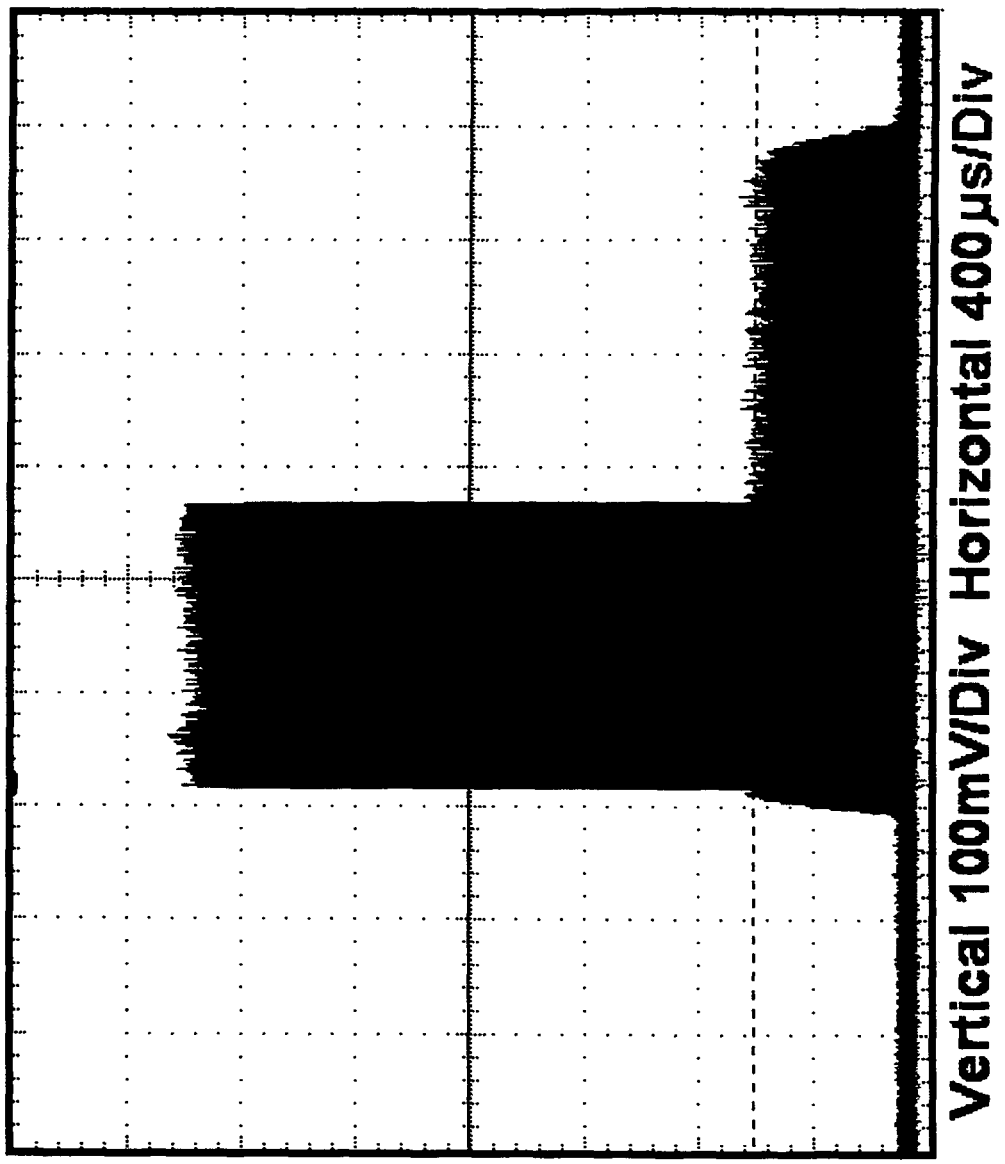
FIG. 4 shows oscilloscope traces of pulses comparing responses using a single shutter and the dual-shutter device of the invention. The traces include response measurements of (a) a clean 1 ms (i.e. milliseconds) pulse using the dual shutter device of the invention, (b) a 1 ms macro-pulse with a broad 2.5 ms ghost pulse envelope using a single shutter, (c) 1 ms pulse using the dual shutter device of the invention, (d) 0.25 ms pulse using a single shutter, (e) 0.25 ms pulse using the dual shutter device of the invention, (f) a 0.1 ms macro-pulse with a 2.5 ms ghost pulse shoulder using a single shutter, and (g) a 0.1 ms macro-pulse using the dual shutter device of the invention.

The following example is provided for illustrative purposes. The dual shutter apparatus of Example 1 was tested to show the performance of the apparatus when both the shutters are triggered independently to create a time delay and differential time window. The results of these tests are shown in FIG. 4. FIG. 4a shows a typical "clean" 1 milli-second macro-pulse generated by the Pockels cells and single mechanical shutter. The pulse has high contrast and no ghost peaks are visible. However, ghost pulses are present in the macro-pulse of FIG. 4a and problematic to the tuning and performance of the instrumentation. To demonstrate the performance of the shutters and visualize the efficacy of the device of the invention, the pulse contrast ratio was degraded by intentionally misaligning the laser beam to make the ghost pulse level more visible. FIG. 4 b shows the ghost pulse envelope that occurs when only the first shutter is closed. In FIG. 4b the main signal 1 milli-second macro-pulse is in the center of the figure and a broad 2.5 milli-second ghost pulse envelope appears as a shoulder to the right of the main signal. The ghost pulse envelope correlates to the exposure time window of one of the mechanical shutters.

Figure 4C:
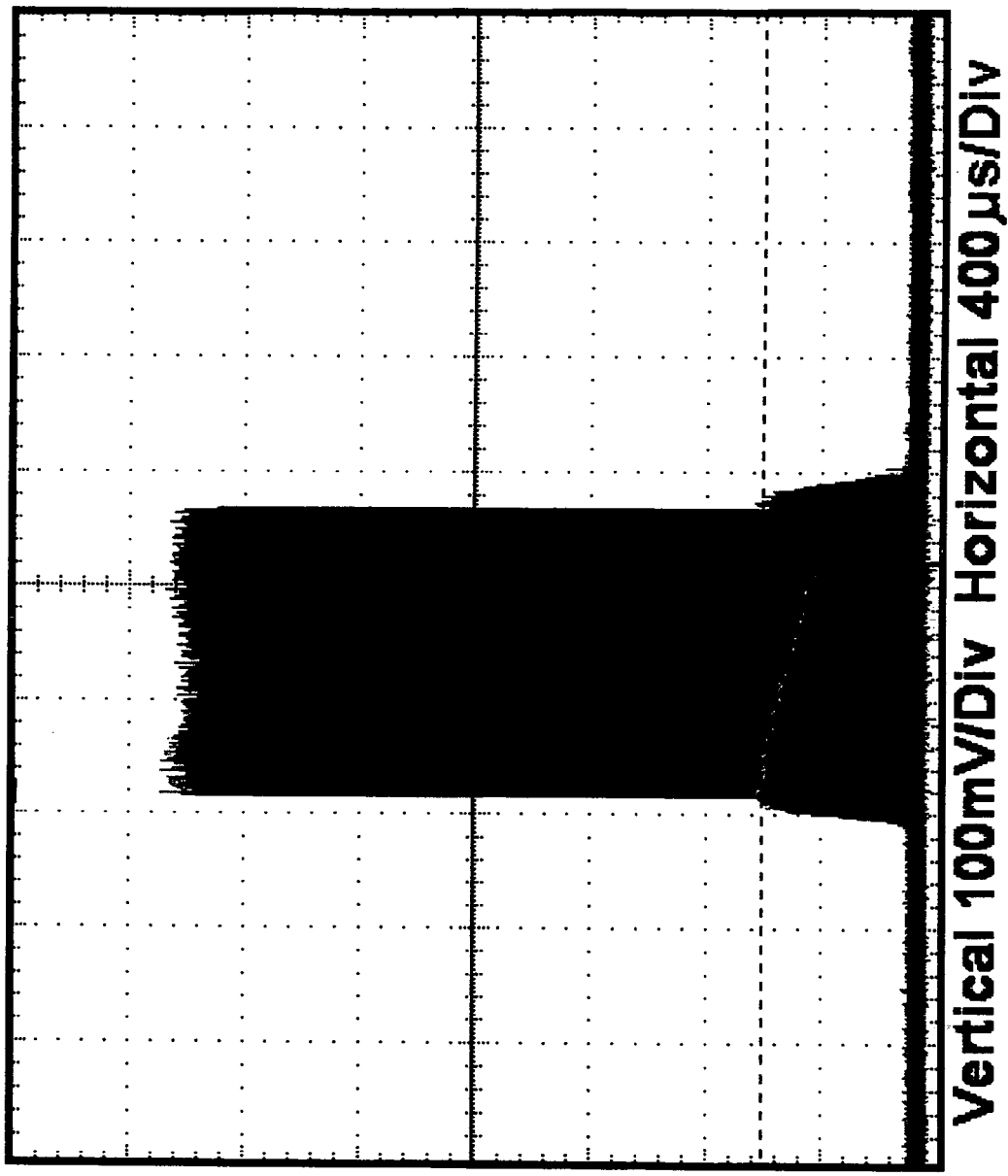

FIG. 4c shows the result when both the first and the second shutter are triggered to create a time delay window. As FIG. 4c shows the 1 milli-second pulse has only a very small shoulder on the right side of the macro-pulse attributable to ghost pulses. Comparing FIGS. 4b and 4c, for a 1 milli-second pulse, the use of only one shutter led to a 2.5 ms shoulder while the use of two shutters operated with a differential window reduced the ghost pulse shoulder substantially.

Figure 4D:
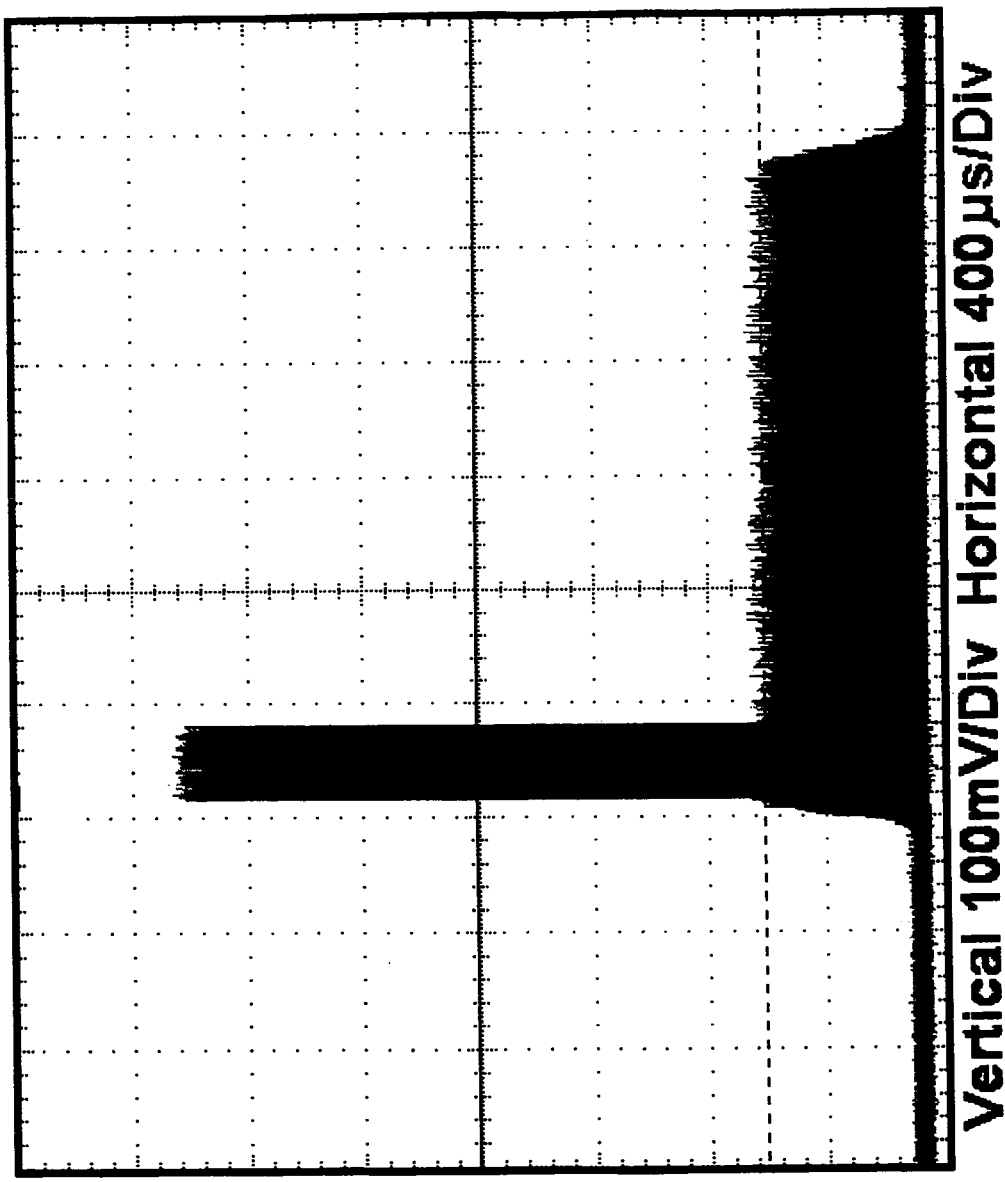
Figure 4E:
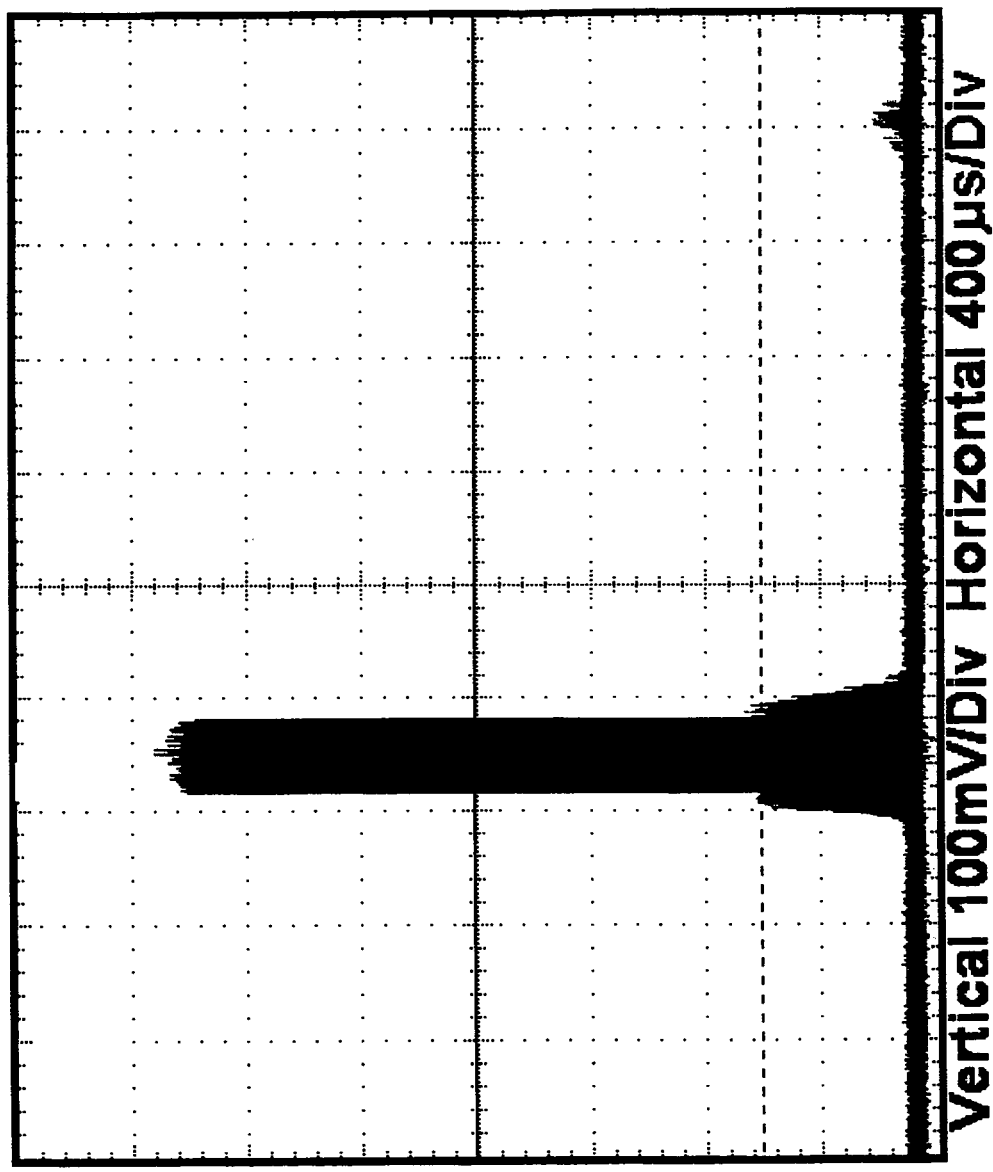
Figure 4F:
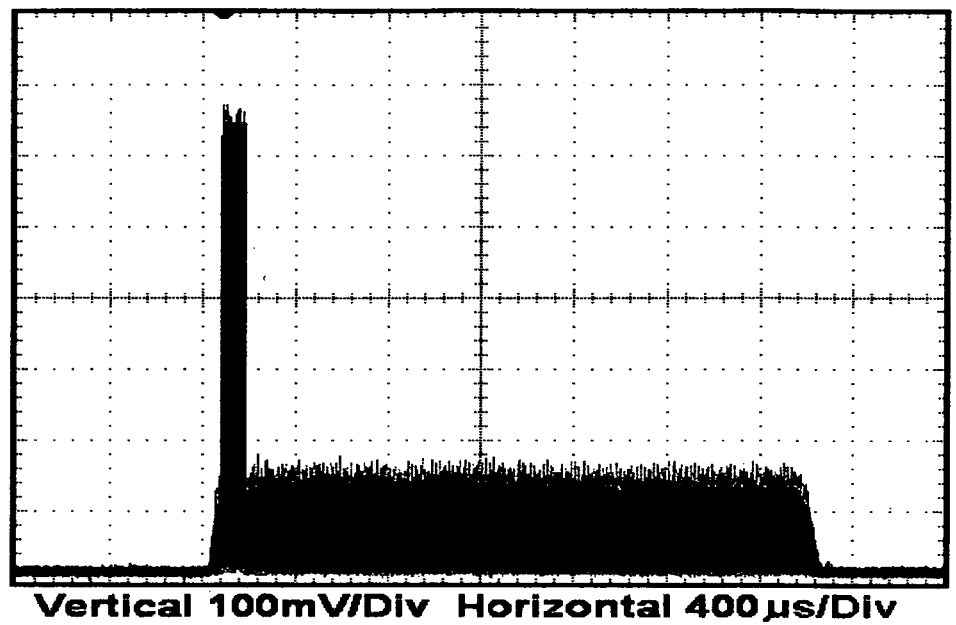
Figure 4G:
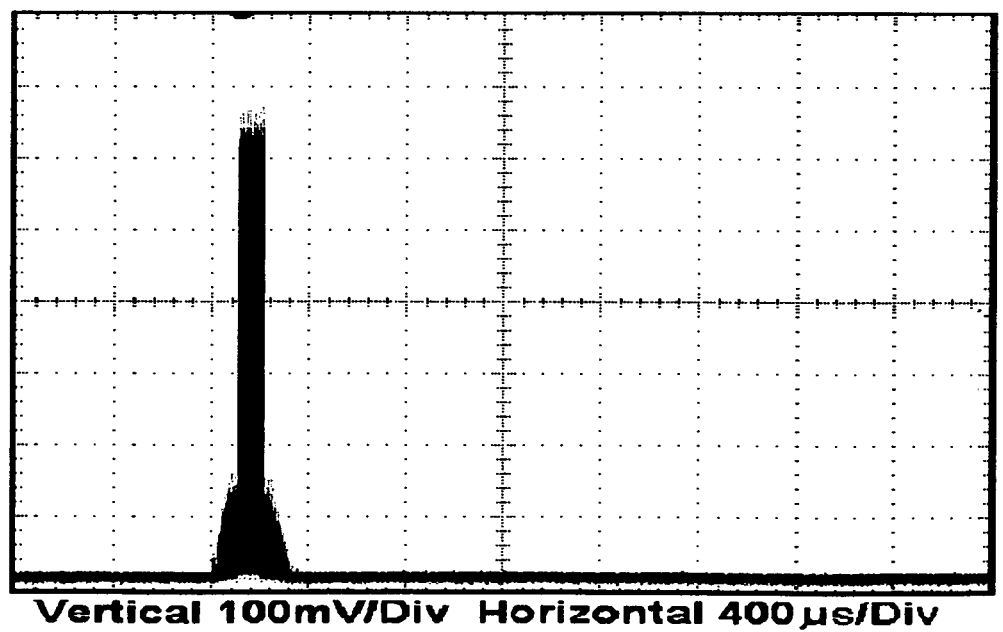
Figure 5A:
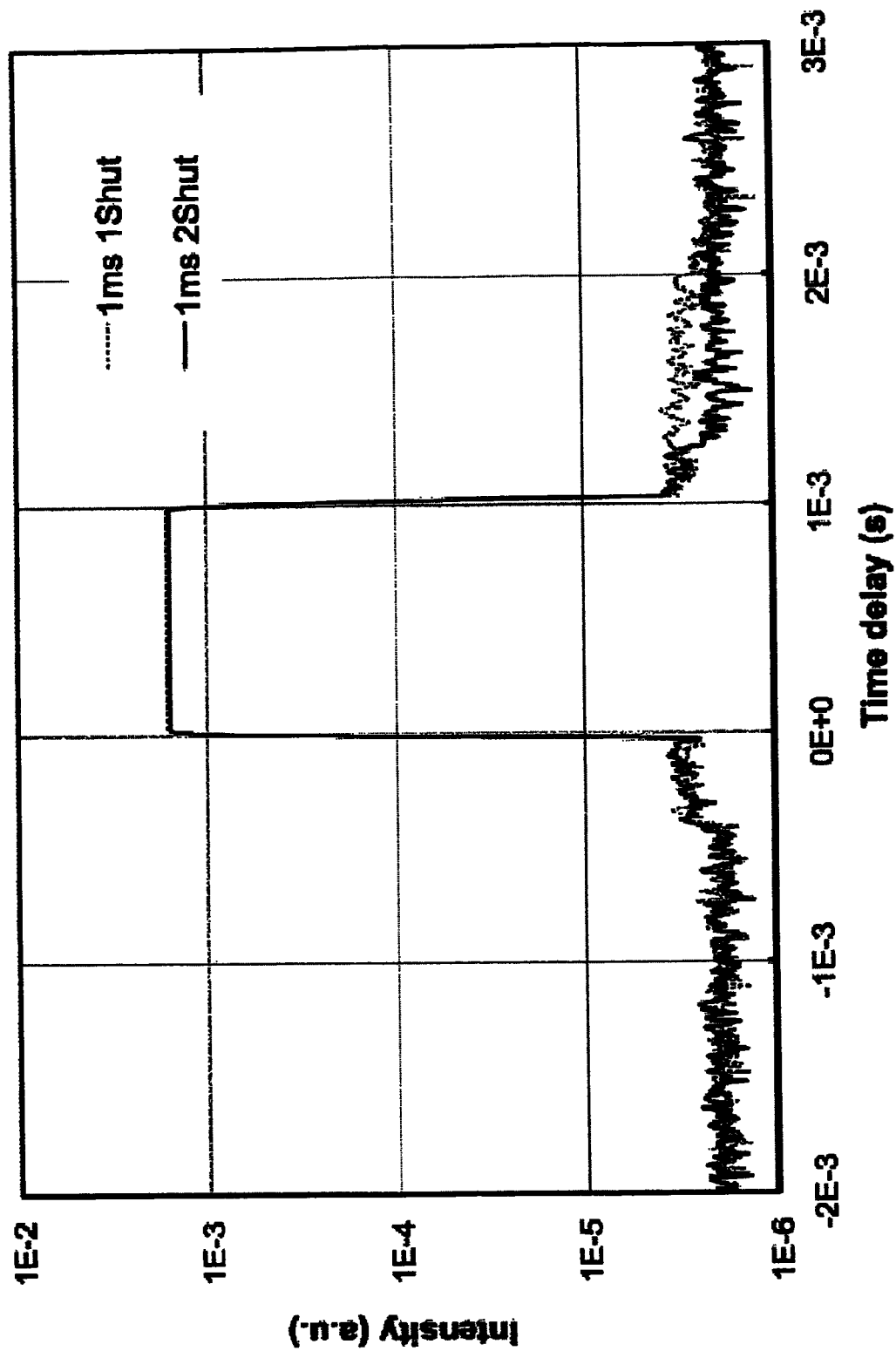
FIGS. 5a, 5b, 5c, and 5d are for macro-pulse lengths of 1 millisecond, 0.5 millisecond, 0.25 millisecond and 0.1 millisecond, respectively.
Figure 5B:
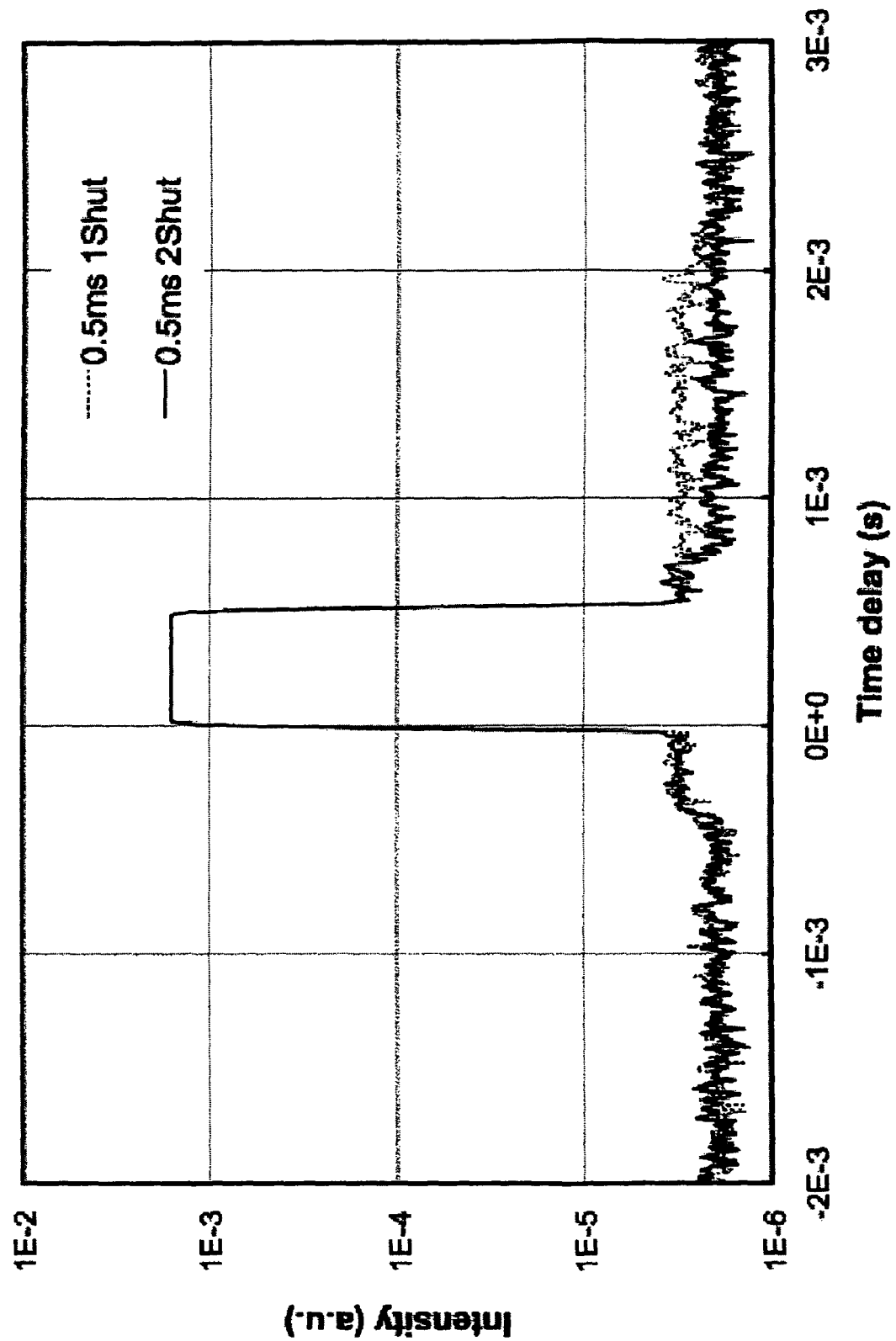
Figure 5C:
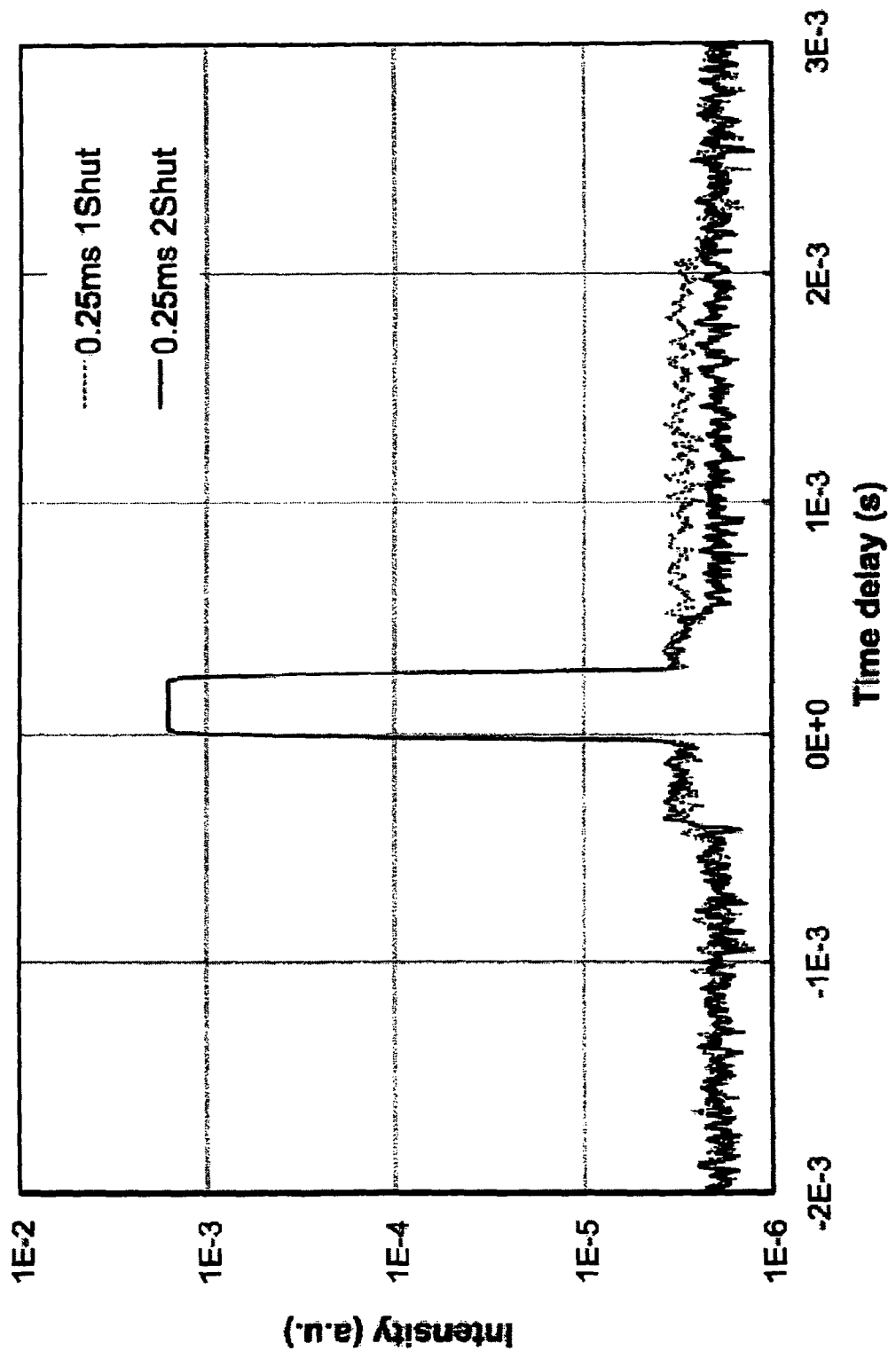
Figure 5D:
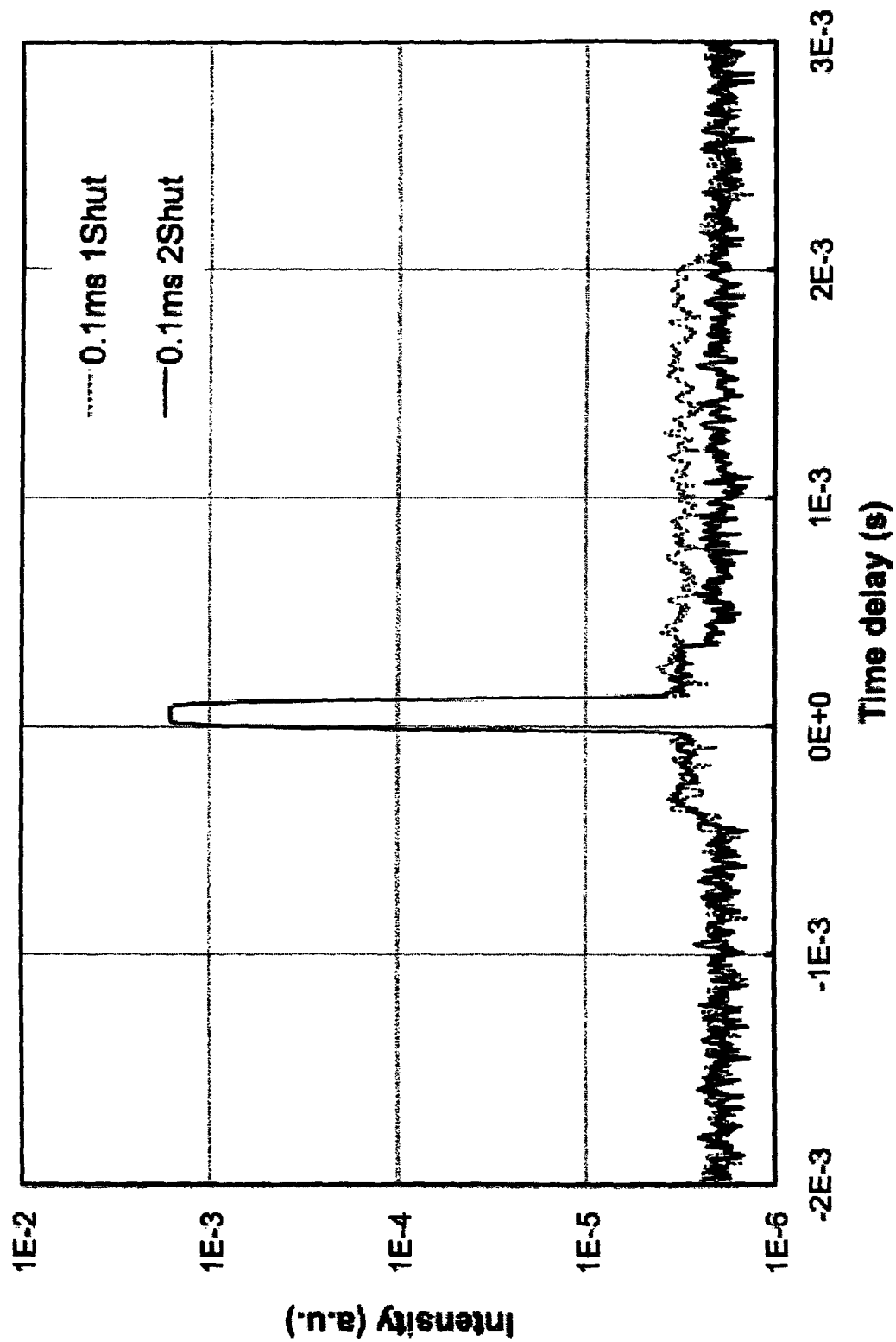

The reduction in the ghost peak shoulder with the dual shutter system of Example 1 was even greater when shorter macro-pulses were used. FIGS. 4 *d* and *e* show results for a 0.25 milli-second macro-pulse. FIG. 4*a* shows the 0.25 milli-second macro-pulse when only the first shutter is close; and FIG. 4*e* shows the result when both the first and the second shutter are triggered to create a time delay window. As the comparison of FIGS. 4*d* and 4*e* shows the amount of ghost pulses was reduced by over 80% (i.e. the ghost pulse shoulder in FIG. 4*e* is less than about 20% of that in FIG. 4*d*) by the use of the dual shutter device with time delay window. FIG. 4*f* shows a 0.1 milli-second macro-pulse and the 2.5 milli-second ghost pulse shoulder when only one shutter is used. FIG. 4*g* shows the result for a 0.1 milli-second macro-pulse when both the first and the second shutter are triggered to create a time delay window. For a 0.1 milli-second pulse the amount of ghost pulses was reduced by about an order of magnitude using the dual shutter device of the invention.

As the data of FIG. 4 shows, typically the shorter the macro-pulse, the greater the improvement that the dual shutter device offers over a single shutter system.

Example 3

The following example is provided for illustrative purposes. The dual shutter apparatus of Example 1 was installed into the drive laser for the Thomas Jefferson National Accelerator Facility ERL (Energy-Recovery-Linac) accelerator and the electron beam current was measure against various laser pulse lengths to test the operation of the dual shutter device installed in an accelerator system. Beam current signal was measured by the cavity beam monitor used for routine operation diagnostics.

FIG. 5 shows beam current for four different macro-pulse lengths. FIGS. 5*a*, 5*b*, 5*c*, and 5*d* are for macro-pulse lengths of 1 millisecond, 0.5 millisecond, 0.25 millisecond and 0.1 millisecond, respectively. Each figure includes an overlay of two traces, one is a trace of data taken using a single shutter and the second is a trace using the dual shutter device of Example 1. The large pulses centrally located in each trace is the macro-pulse. As the figures shows for a given macro-pulse width the portion of the trace related to the macro-pulse taken using a single shutter and the portion of the trace related to the macro-pulse using the dual shutter device overlay so similarly as to be indistinguishable. In all cases in FIG. 5, the two lines appear to the right of the macro-pulse, the upper line appearing as a shoulder on the macro-pulse and the lower essentially along baseline. The shoulder is in the trace taken using a single shutter and is due to ghost pulses that appear when a single shutter is used. The lower line is from the trace using the dual shutter device and, as it is essentially baseline, shows that the ghost pulses have been effectively blocked (removed) in the dual shutter system. Comparing FIGS. 5*a* and 5*d*, shows that the difference between the trace taken with the single shutter and the trace taken with the dual shutter become more pronounced as the pulse width is decreased.

This data taken in an ERL accelerator is consistent with the data taken in the model system of Example 2 and shown in FIG. 4.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A device for producing enhanced pulse contrast ratio, the device comprising:
   a. a first mechanical shutter and a second mechanical shutter, the first and the second mechanical shutters positioned in series in a beam path of a laser pulse;
   b. a first trigger wherein the first trigger activates a first shutter change between an open and a closed position;
   c. a second trigger wherein the second trigger activates a second shutter change between an open and a closed position;
   d. a Pockels cell positioned in the beam path in parallel with the first and the second shutters and wherein the laser pulse passes sequentially through the Pockels cell, the first shutter and the second shutter; and
   e. a controller that sets a predetermined time delay between the first trigger activating the first shutter and the second trigger activating the second shutter wherein the time delay produces a differential time window between the first shutter change and a second shutter change,
   wherein the time delay produces a differential time window that prevents transmission of a plurality of ghost pulses.

2. The device of claim 1 wherein the predetermined time delay is adjustable.

3. The device of claim 1, further comprising a cooling system, the cooling system in communication with the first and the second shutter.

4. The device of claim 1, wherein the laser pulse is provided by a drive laser.

5. The device of claim 4, wherein the drive laser drives a photo-cathode based accelerator.

6. A method for enhancing pulse contrast ratio, the method comprising:
   a. providing a first mechanical shutter and a second mechanical shutter, the first and the second mechanical shutters positioned sequentially in parallel in a beam path of a laser pulse, a first trigger wherein the first trigger activates a first shutter change between an open and a closed position, a second trigger wherein the second trigger activates a second shutter change between an open and a closed position, and a controller that sets a predetermined time delay between the first trigger activating the first shutter and the second trigger activating the second shutter wherein the time delay produces a differential time window between the first shutter change and a second shutter change;
   b. providing a laser macro-pulse from the laser pulse;
   c. selecting and setting a predetermined time delay;
   d. producing a differential time window; said time delay producing a differential time window that prevents transmission of one or more ghost pulses,
   e. passing the laser beam through the first and the second shutter in the differential time window, and
   f. providing a Pockels cell positioned in the beam path in parallel with the first and the second shutters and wherein the beam path passes sequentially through the Pockels cell, the first shutter and the second shutter.

7. The method of claim 6 further comprising detecting a resultant laser pulse signal that passes though the differential time window.

8. The method of claim 6 further comprising, providing cooling to the first and the second shutter.

9. The method of claim 6, wherein the laser pulse is provided by a drive laser.

10. The method of claim 9, wherein the drive laser drives a photo-cathode based accelerator.

* * * * *